United States Patent
Brown et al.

(10) Patent No.: US 8,009,672 B2
(45) Date of Patent: *Aug. 30, 2011

(54) APPARATUS AND METHOD OF SPLITTING A DATA STREAM OVER MULTIPLE TRANSPORT CONTROL PROTOCOL/INTERNET PROTOCOL (TCP/IP) CONNECTIONS

(75) Inventors: Deanna Lynn Quigg Brown, Pflugerville, TX (US); Vinit Jain, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

This patent is subject to a terminal disclaimer.

(21) Appl. No.: 11/778,036

(22) Filed: Jul. 14, 2007

(65) Prior Publication Data

US 2007/0291759 A1    Dec. 20, 2007

(51) Int. Cl.
*H04L 12/28* (2006.01)
(52) U.S. Cl. .................................................... 370/392
(58) Field of Classification Search .................. 370/392
See application file for complete search history.

(56) References Cited

U.S. PATENT DOCUMENTS

| | | |
|---|---|---|
| 4,383,316 A | 5/1983 | Seidel |
| 4,775,987 A | 10/1988 | Miller |
| 5,231,649 A | 7/1993 | Duncanson |
| 5,475,706 A | 12/1995 | Kobayashi et al. |
| 5,594,868 A | 1/1997 | Nakagoshi et al. |
| 5,931,964 A | 8/1999 | Beming et al. |
| 6,044,107 A * | 3/2000 | Gatherer et al. ............ 375/222 |
| 6,112,252 A | 8/2000 | Hausman et al. |
| 6,311,222 B1 | 10/2001 | Crump et al. |
| 6,574,215 B2 | 6/2003 | Hummel |
| 6,751,263 B1 * | 6/2004 | Nie ............................ 375/260 |
| 6,876,669 B2 | 4/2005 | Shalom |
| 2001/0024427 A1 | 9/2001 | Suzuki |
| 2002/0122383 A1 | 9/2002 | Wu et al. |
| 2003/0081582 A1 | 5/2003 | Jain et al. |
| 2003/0103460 A1 | 6/2003 | Kamath et al. |
| 2003/0107994 A1 | 6/2003 | Jacobs et al. |

FOREIGN PATENT DOCUMENTS

WO    WO 9820655    *  5/1998

* cited by examiner

*Primary Examiner* — Ayaz R Sheikh
*Assistant Examiner* — Blanche Wong
(74) *Attorney, Agent, or Firm* — Van Leeuwen & Van Leeuwen; Diana R. Gerhardt

(57) ABSTRACT

A method, system and apparatus for improving data transfer rate over a network are provided. When a piece of data is to be transmitted to a target system, it is divided into a number of packets and a determination is made as to whether the number of packets exceeds a threshold number. If so, the packets are transferred in parallel over a plurality of network connections. The ideal network connections are TCP/IP connections. Thus, each packet has an IP header, which contains an IP identification field. An indicium is placed into the IP identification field for proper reconstruction of the data by the target system.

16 Claims, 7 Drawing Sheets

APPARATUS AND METHOD OF SPLITTING A DATA STREAM OVER MULTIPLE TRANSPORT CONTROL PROTOCOL/INTERNET PROTOCOL (TCP/IP) CONNECTIONS

BACKGROUND OF THE INVENTION

1. Technical Field

The present invention is directed to communications networks. More specifically, the present invention is directed to a method and apparatus for splitting a data stream over multiple TCP/IP connections.

2. Description of Related Art

Data storage is an essential part of any company's infrastructure. Rapidly increasing storage capacities and network speeds challenge storage system performance, whether it is at the enterprise level or below. IP storage addresses the requirements of a range of environments from single server to computer room, Internet data center, campus and WAN (wide area network).

As is well known, SCSI is a commonly used industry standard protocol for storage devices. Using the SCSI protocol, drive control commands and data are sent to the drives. Responses and status messages, as well as data read from the devices, are passed through SCSI controllers. In a system supporting iSCSI, a user or software application issues a command to store or retrieve data on a SCSI storage device. The request is processed by the operating system and is converted to one or more SCSI commands that are then passed to an application program or to a card. The command and data are encapsulated by representing them as a serial string of bytes proceeded by iSCSI headers. The encapsulated data is then passed to a TCP/IP layer that breaks it into packets suitable for transfer over the network. If required, the encapsulated data can also be encrypted for transfer over an insecure network. The packets are sent over the network or the Internet.

At the receiving storage controller, the packets are recombined and, if necessary, decrypted into the original encapsulated SCSI commands and data. The storage controller then uses the iSCSI headers to send the SCSI control commands and data to the appropriate drive, which performs the functions that were requested by the original computer or application. If a request for data has been sent, the data is retrieved from the drive, encapsulated and returned to the requesting computer. The entire process is transparent to the user.

In any event, due to the volume of data that may be being transacted, a higher data transfer rate may be convenient. Thus, what is needed is a method and apparatus to boost the data transfer rate.

SUMMARY OF THE INVENTION

The present invention provides a method, system and apparatus for improving data transfer rate over a network. When a piece of data is to be transmitted to a target system, it is divided into a number of packets and a determination is made as to whether the number of packets exceeds a threshold number. If so, the packets are transferred in parallel over a plurality of network connections. The ideal network connections are TCP/IP connections. Thus, each packet has an IP header, which contains an IP identification field. An indicium is placed into the IP identification field for proper reconstruction of the data at the target system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flow chart of a process that may be used with the invention.

DETAILED DESCRIPTION OF THE PREFERRED EMBODIMENT

Figure 1:
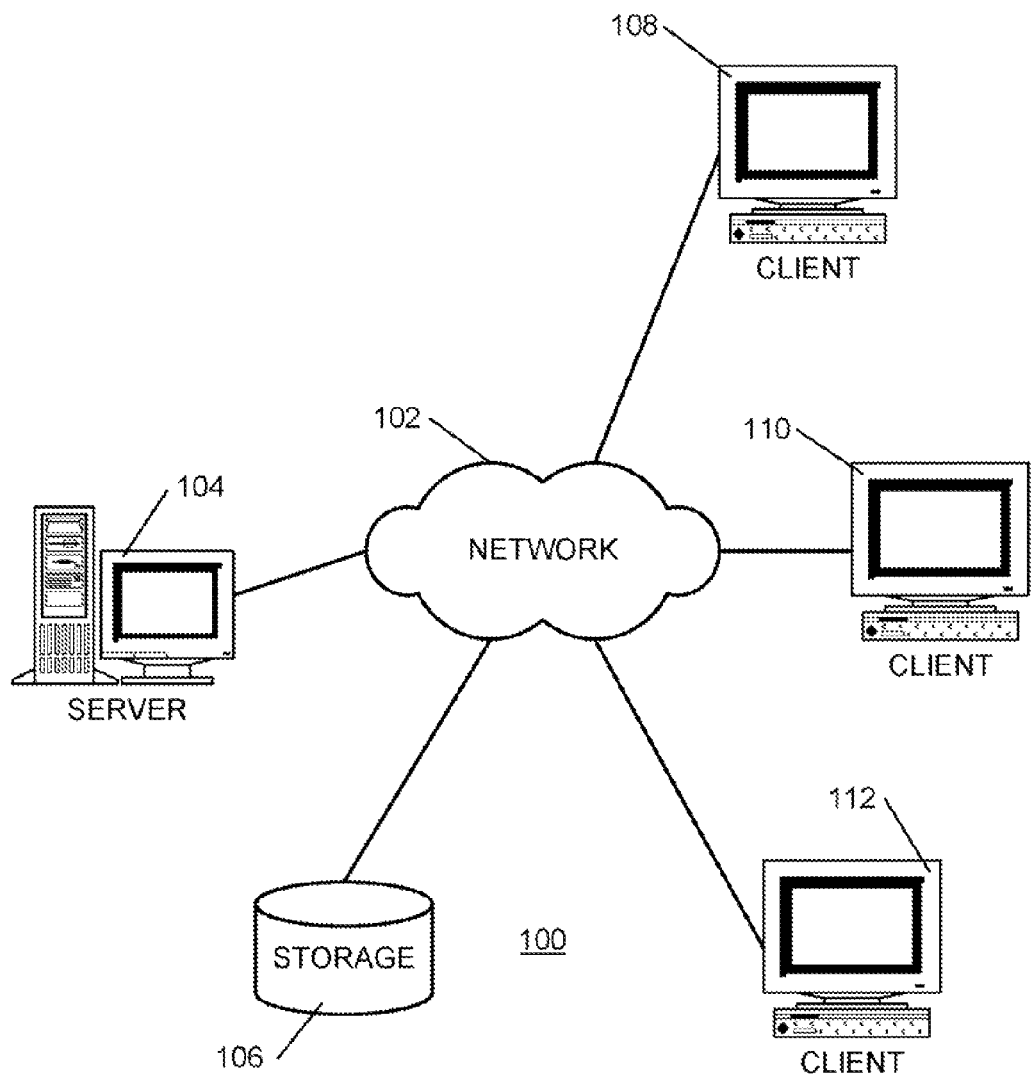
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
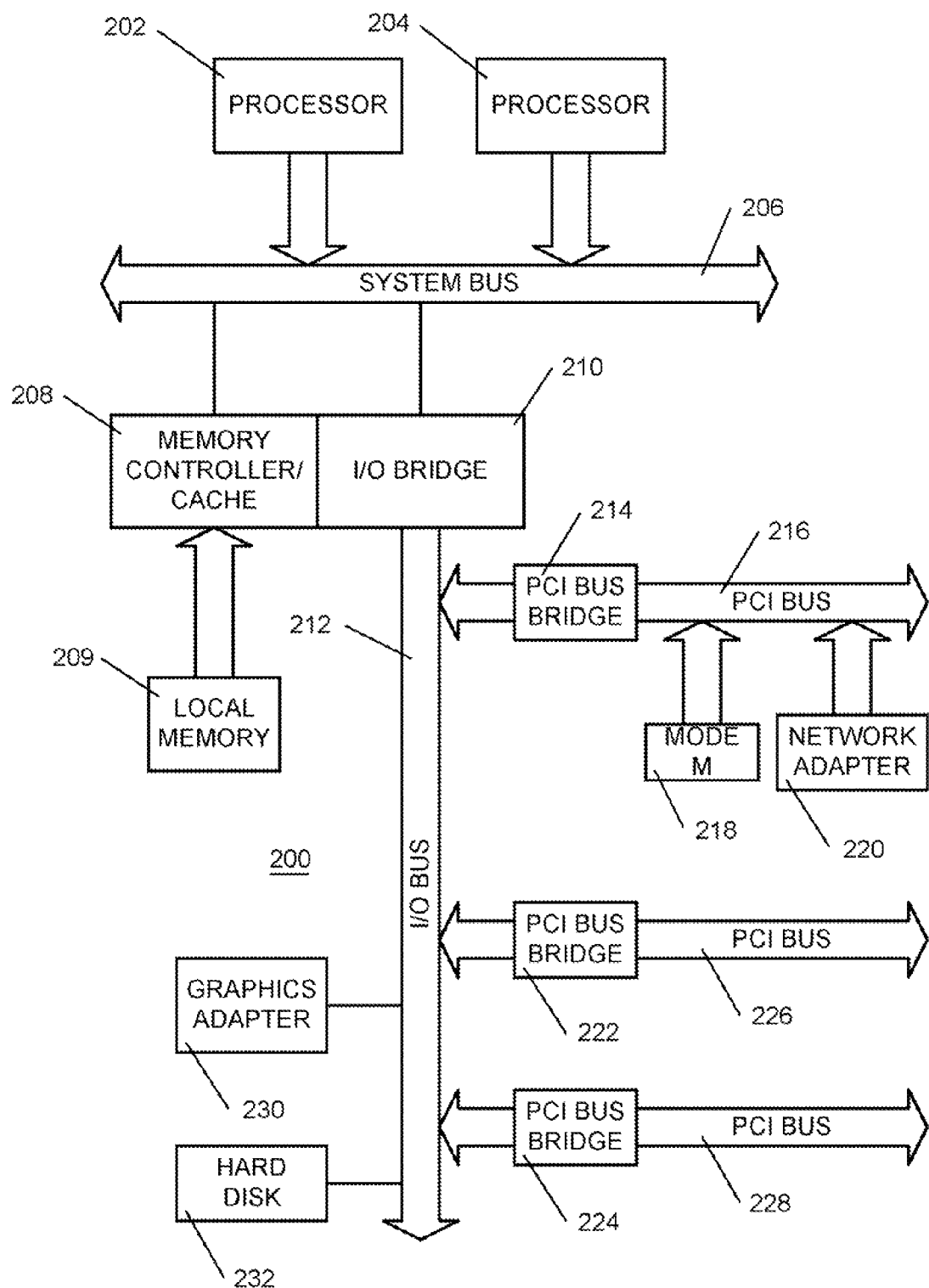
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
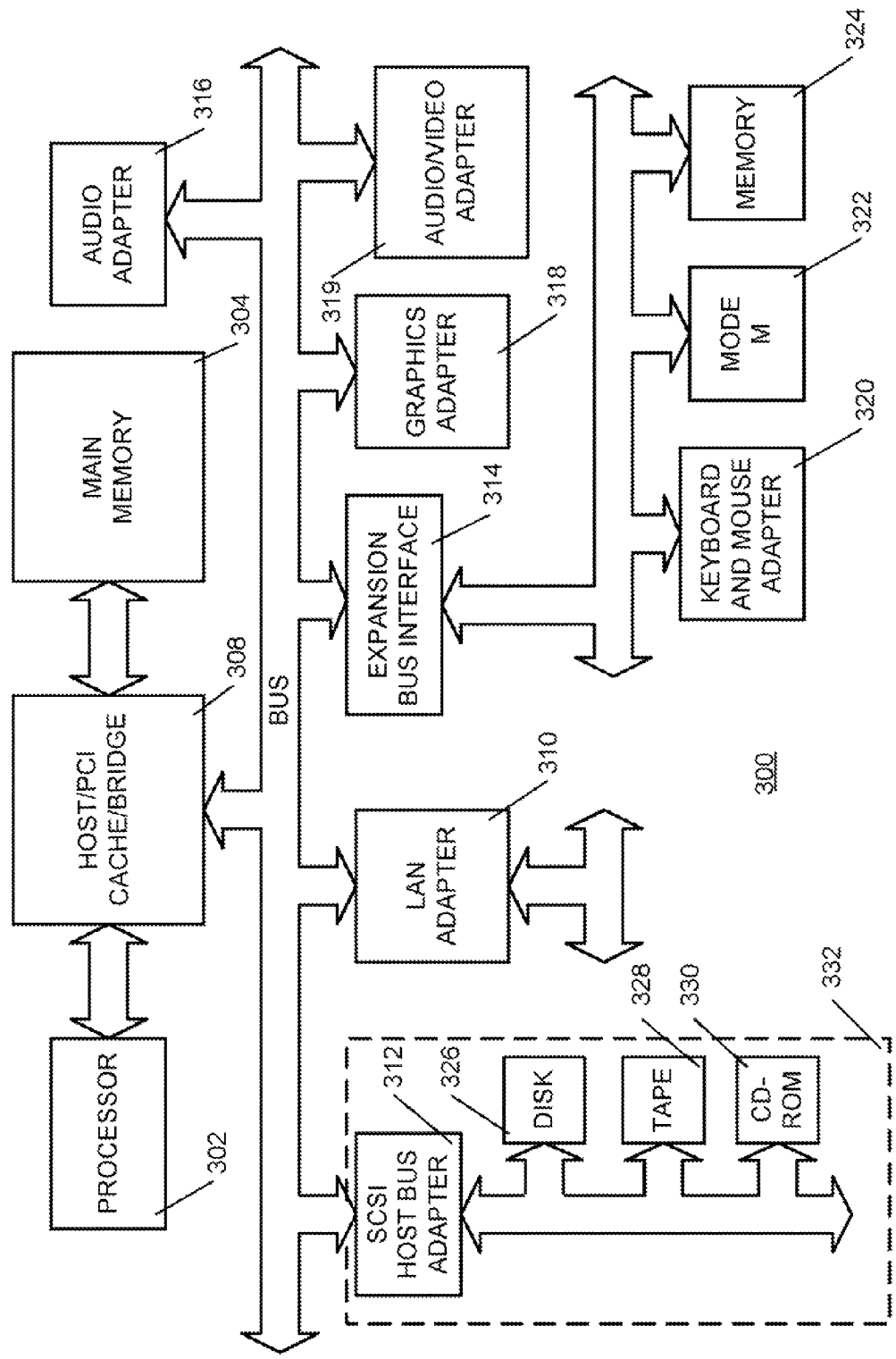
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The present invention provides an apparatus and method of splitting data stream over multiple TCP/IP connections to booster data transfer rate. The invention may be local to client systems 108, 110 and 112 of FIG. 1 or to the server 104 or to both the server 104 and clients 108, 110 and 112. Consequently, the present invention may reside on any non-transitory computer readable medium (i.e., floppy disk, compact disk, hard disk, ROM, RAM, etc.) used by a computer system.

Figure 4:
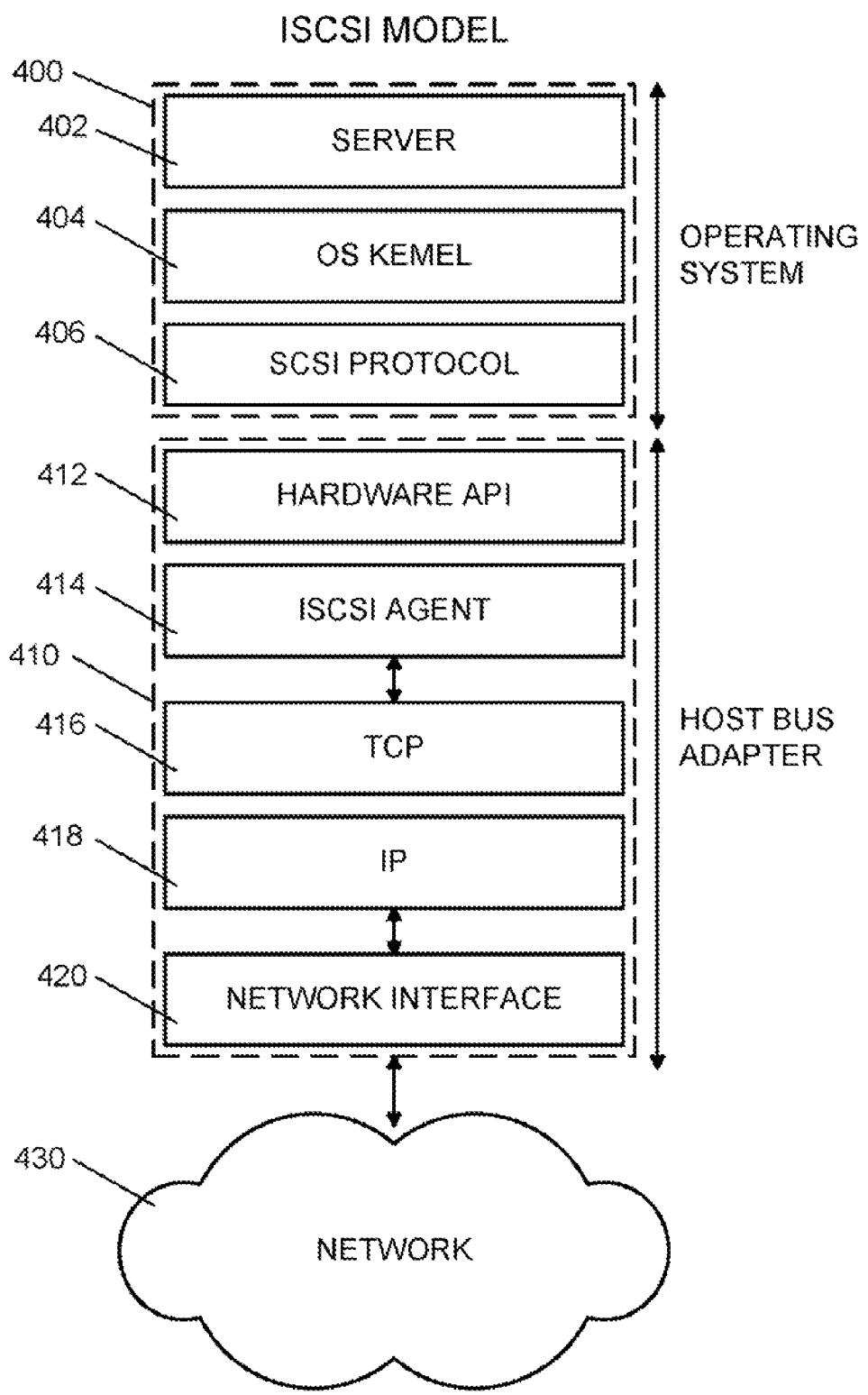
FIG. 4 depicts a system incorporating an iCSCI sub-system.

FIG. 4 depicts a system incorporating an iCSCI protocol. Operating system 400 and host bus adapter 410 make up the system. Operating system 400 is made up of server 402, kernel 404 and SCSI protocol 606. Host bus adapter 410 contains hardware API (application program interface) 412, iSCSI agent 414, TCP stack 416, IP stack 418 and network interface 420. The network interface 420 interacts with network 430.

Figure 5:
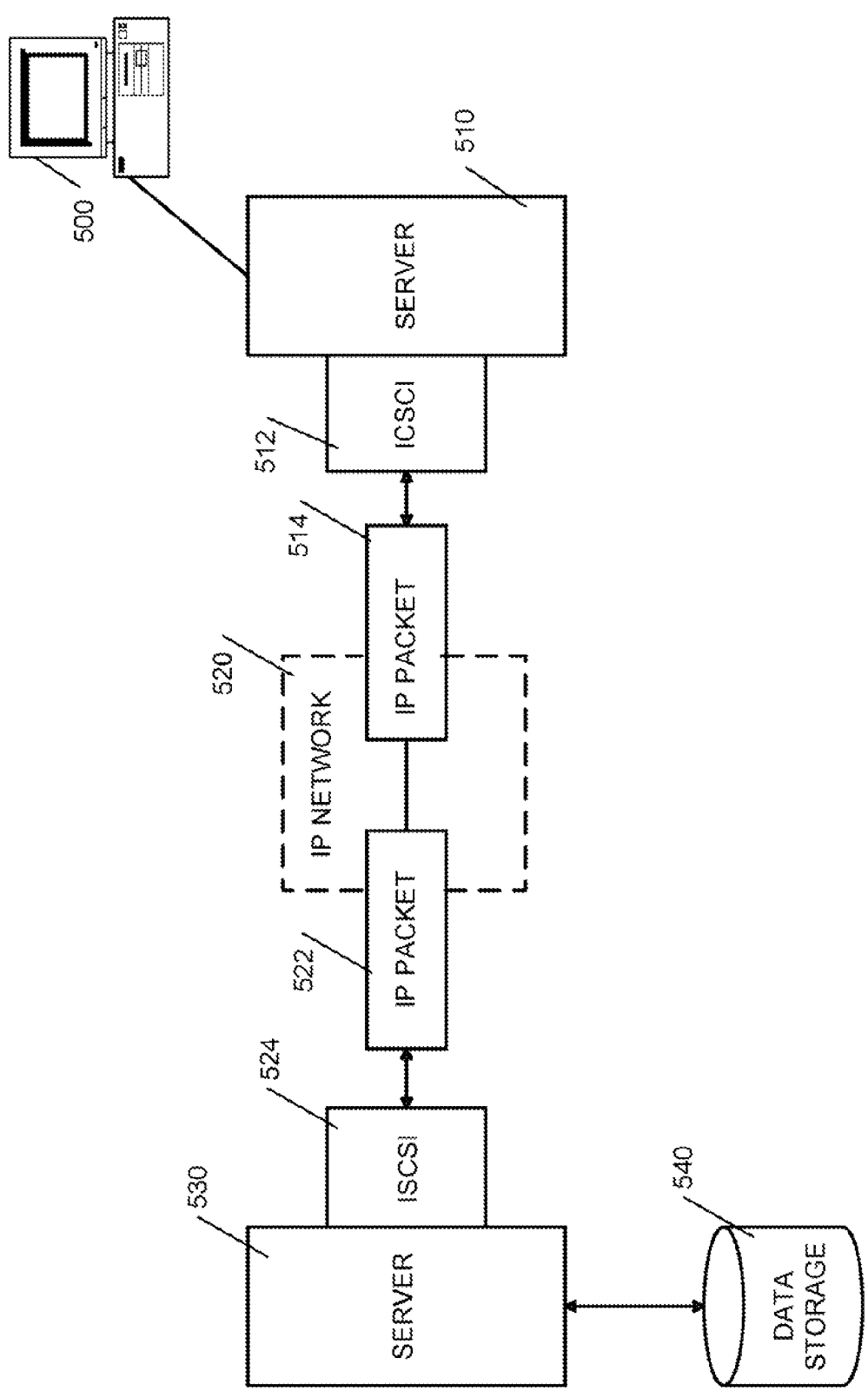
FIG. 5 depicts a representative iSCSI system.

FIG. 5 depicts a representative iSCSI system. As mentioned before, iSCSI carries data and SCSI commands over TCP/IP networks, enabling data transfers over networks and data storage over long distances. When an application or a user at client station 500 issues a request to server 510 for data, a file or an application, if the data is not local to the server 510, the operating system running on the server will generate the SCSI commands and data request. The commands and request, if necessary, are encrypted and encapsulated. TCP and IP headers are added and the commands and request enter the network. Note that depending on the length of the commands and request, they may be broken up into TCP/IP packets before entering the network.

At the receiving end, the packet or packets are disassembled or, if encrypted, decrypted. Then the SCSI commands and request are separated from each other. The commands and request are sent to the SCSI controller and from the SCSI controller to the SCSI storage system 540. The requested data is then returned in response to the request using the same protocol.

Figure 6:
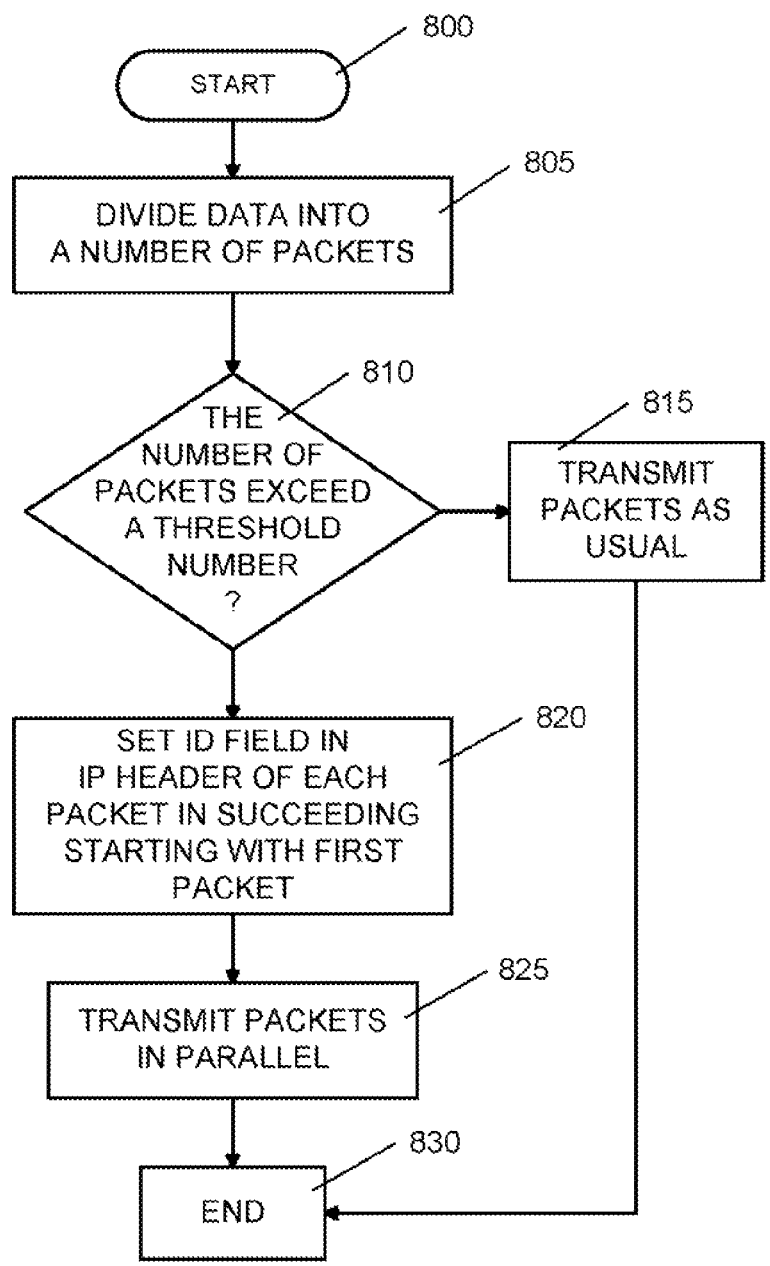
FIG. 6 depicts a data packet with requisite headers before being transmitted on the network.

The present invention uses the IP header added to the packets to enable the data transfer over multiple TCP/IP connections to increase data transfer rates. For a proper perspective, FIG. 6 depicts a data packet with requisite headers before being transmitted on the network. The SCSI commands and request as well as the requested data are first broken up into data packets and to each data packet 640, an iSCSI header 630, a TCP header 620, an IP header 610 and an Ethernet header 600 are added.

Figure 7:
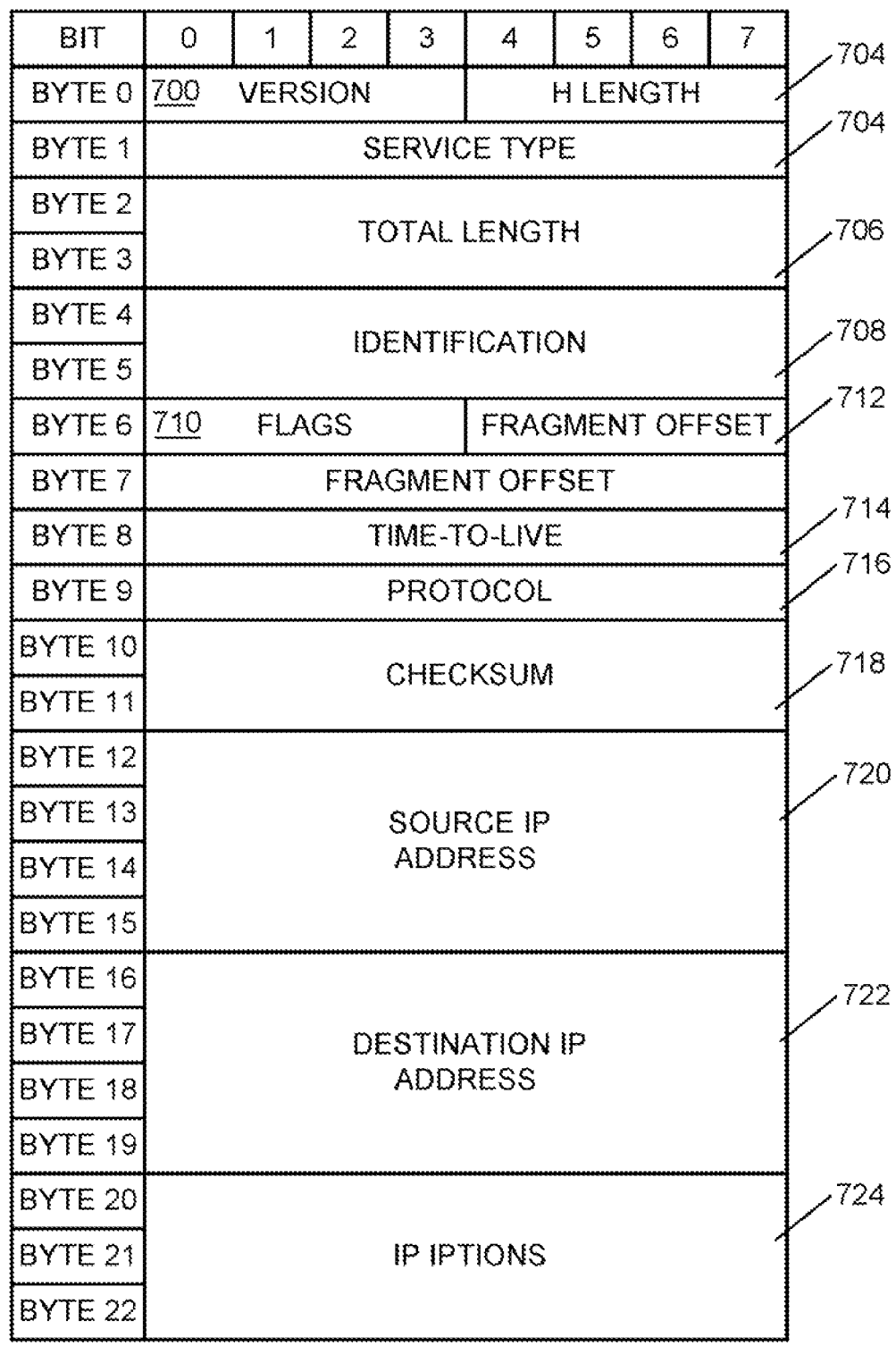
FIG. 7 depicts an IP header in bytes format.

The description of the invention will be focused on the IP header, since the other headers are not necessary to understand the invention. FIG. 7 depicts an IP header in bytes format. Version 700 is the version of the IP protocol used to create the data packet and header length 702 is the length of the header. Service type 704 specifies how an upper layer protocol would like a current data packet handled. Each data packet is assigned a level of importance. Total length 706 specifies the length, in bytes, of the entire IP data packet, including the data and header. Identification 708 is used when a packet is fragmented into smaller pieces while traversing the Internet. This identifier is assigned by the transmitting host so that different fragments arriving at the destination can be associated with each other for reassembly. For example, if while traversing the Internet a router were to fragment the packet, the router would use the IP identification number originally in the header with the first fragment, each succeeding fragment may have a successive IP identification number.

Flags 710 is used for fragmentation and reassembly. The first bit is called "More Fragments" (MF) bit, and is used to indicate the last fragment of a packet so that the receiver knows that the packet can be reassembled. The second bit is the "Don't Fragment" (DF) bit, which suppresses fragmentation. The third bit is unused and is always set to zero (0). Fragment Offset 712 indicates the position of the fragment in the original packet. In the first packet of a fragment stream, the offset will be zero (0). In subsequent fragments, this field indicates the offset in increments of 8 bytes. Thus, it allows the destination IP process to properly reconstruct the original data packet. Time-to-Live 714 maintains a counter that gradually decrements each time a router handles the data packet. When it is decremented down to zero (0), the data packet is discarded. This keeps data packets from looping endlessly. Protocol 716 indicates which upper-layer protocol (e.g., TCP, UDP etc.) is to receive the data packets after IP processing has completed. Checksum 718 helps ensure the IP header integrity. Source IP Address 720 specifies the sending node and destination IP Address 722 specifies the receiving node. Options 724 allows IP to support various options, such as security.

The invention proposes enhancing data transfer rate by using multiple TCP/IP connections or data paths. When an application is sending a single logical data stream over multiple data paths, the receiver has to be able to reconstruct the data stream from the multiple paths. The invention uses the two-byte identification 708 of the IP header as a counter to allow for the reconstruction of the data. For example, suppose a data stream is being transmitted using five TCP connections (i.e., TCP connections 1-5), packet $P_1$ may be transmitted over TCP connection 1 using 1234 as an IP identification number. $P_2$, $P_3$, $P_4$ and $P_5$ may be transmitted over TCP connections 2, 3, 4 and 5 with IP identifications 1235, 1236, 1237 and 1238, respectively. The next group of packets (i.e., $P_6$-$P_{10}$) may be transmitted over TCP connections 1-5 using IP identifications 1239-1244 etc.

Note that the IP identification number increases sequentially as the next packet in the data stream is sent irrespective of the TCP/IP connection used to send the packet. Note also that this scheme does not violate the IP protocol in regard to fragmentation and the succeeding number in the identification that it dictates since when a packet is fragmented the flags field 710 and the fragment offset 712 clearly identify such.

As can be seen, no data overhead is added as the IP identification field is included in every packet. In addition, the invention provides extra security since unless the data going over all the TCP connections are captured, the data stream may not be re-constructible. Furthermore, although the invention is explained using iSCSI, the invention is clearly not restricted to iSCSI. That is, the invention is applicable to any transfer of data over a network involving more than one data packet.

FIG. 8 is a flow chart of a process that may be used with the invention. The process starts each time data is to be transmitted over a network (step 800). The data is divided into a number of packets then a check is made to determine whether the number of packets exceed a threshold number (steps 805 and 810). If so, when the IP header is added to the packet, the identification field of the IP header is set to a number. Specifically, the IP identification field of the first packet is set to a number and the IP identification field of each succeeding packet is set to a succeeding number; thus enabling reconstruction at the other end. Then packets are transferred in parallel over a plurality of IP connections (steps 820-830). If the number of packets does not exceed the threshold number, the packets are transferred in the conventional method of transmitting the network data (step 815).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transmitting data from a source system to a target system over a network, the method comprising:
   dividing the data into a plurality of packets to transmit over the network;
   determining whether the number of the plurality of packets exceeds a threshold number, the threshold number corresponding to an amount of packets to transfer over a single network connection;
   in response to determining that the number of the plurality of packets exceeds the threshold number:
       including an indicium in each of the plurality of packets, the indicium utilized to reconstruct the data;
       establishing a plurality of network connections over the network; and
       transmitting the plurality of packets in parallel over the plurality of network connections.

2. The method of claim 1 wherein the plurality of network connections are TCP/IP connections.

3. The method of claim 2 wherein each of the plurality of packets has an IP header, said IP header including the indicium and having an IP identification field.

4. The method of claim 1 wherein the source system and the target system support iSCSI commands and the data is iSCSI data.

5. A computer program product stored on a non-transitory computer readable medium for transmitting data from a source system to a target system over a network, the computer program product comprising functional descriptive material that, when executed by a computer system, causes the computer system to perform actions that include:
   dividing the data into a plurality of packets to transmit over the network;
   determining whether the number of the plurality of packets exceeds a threshold number, the threshold number corresponding to an amount of packets to transfer over a single network connection;

in response to determining that the number of the plurality of packets exceeds the threshold number:
    including an indicium in each of the plurality of packets, the indicium utilized to reconstruct the data;
    establishing a plurality of network connections over the network; and
    transmitting the plurality of packets in parallel over the plurality of network connections.

6. The computer program product of claim 5 wherein the plurality of network connections are TCP/IP connections.

7. The computer program product of claim 6 wherein each of the plurality of packets has an IP header, said IP header including the indicium and having an IP identification field.

8. The computer program product of claim 5 wherein the source system and the target system support iSCSI commands and the data is iSCSI data.

9. An apparatus for transmitting data from a source system to a target system over a network, the apparatus performing steps of:
    dividing the data into a plurality of packets to transmit over the network;
    determining whether the number of the plurality of packets exceeds a threshold number, the threshold number corresponding to an amount of packets to transfer over a single network connection;
    in response to determining that the number of the plurality of packets exceeds the threshold number:
        including an indicium in each of the plurality of packets, the indicium utilized to reconstruct the data;
        establishing a plurality of network connections over the network; and
        transmitting the plurality of packets in parallel over the plurality of network connections.

10. The apparatus of claim 9 wherein the plurality of network connections are TCP/IP connections.

11. The apparatus of claim 10 wherein each of the plurality of packets has an IP header, said IP header including the indicium and having an IP identification field.

12. The apparatus of claim 9 wherein the source system and the target system support iSCSI commands and the data is iSCSI data.

13. A computer system for transmitting data to a target system over a network, the computer system comprising:
    at least one memory device for storing code data;
    a plurality of processors for processing the code data in order to perform actions of:
        dividing the data into a plurality of packets to transmit over the network;
        determining whether the number of the plurality of packets exceeds a threshold number, the threshold number corresponding to an amount of packets to transfer over a single network connection;
        in response to determining that the number of the plurality of packets exceeds the threshold number:
            including an indicium in each of the plurality of packets, the indicium utilized to reconstruct the data;
            establishing a plurality of network connections over the network; and
            transmitting the plurality of packets in parallel over the plurality of network connections.

14. The computer system of claim 13 wherein the plurality of network connections are TCP/IP connections.

15. The computer system of claim 14 wherein each of the plurality of packets has an IP header, said IP header including the indicium and having an IP identification field.

16. The computer system of claim 13 wherein the source system and the target system support iSCSI commands and the data is iSCSI data.

* * * * *